United States Patent
Katagiri

(10) Patent No.: US 11,945,948 B2
(45) Date of Patent: Apr. 2, 2024

(54) RUBBER-REINFORCING CORD AND RUBBER PRODUCT INCLUDING SAME

(71) Applicant: Nippon Sheet Glass Company, Limited, Tokyo (JP)

(72) Inventor: Shinya Katagiri, Aichi (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 880 days.

(21) Appl. No.: 16/965,945

(22) PCT Filed: Feb. 4, 2019

(86) PCT No.: PCT/JP2019/003808
§ 371 (c)(1),
(2) Date: Jul. 29, 2020

(87) PCT Pub. No.: WO2019/159733
PCT Pub. Date: Aug. 22, 2019

(65) Prior Publication Data
US 2021/0087389 A1    Mar. 25, 2021

(30) Foreign Application Priority Data
Feb. 15, 2018    (JP) .................................. 2018-024917

(51) Int. Cl.
| | |
|---|---|
| C08L 75/04 | (2006.01) |
| B29C 70/10 | (2006.01) |
| B29D 29/08 | (2006.01) |
| C08J 5/08 | (2006.01) |
| C08L 1/02 | (2006.01) |
| D06M 15/05 | (2006.01) |

(Continued)

(52) U.S. Cl.
CPC .............. *C08L 75/04* (2013.01); *B29C 70/10* (2013.01); *B29D 29/08* (2013.01); *C08J 5/08* (2013.01);

(Continued)

(58) Field of Classification Search
CPC .................................. E04D 5/06; C08L 23/02
See application file for complete search history.

(56) References Cited

U.S. PATENT DOCUMENTS

2015/0152590 A1* 6/2015 Knox ....................... C08K 9/04
524/556
2019/0233619 A1    8/2019 Kato

FOREIGN PATENT DOCUMENTS

| EP | 3392301 | 10/2018 |
|---|---|---|
| JP | H06184853 | 7/1994 |

(Continued)

OTHER PUBLICATIONS

Espacenet machine translation to English of WO 2017/183660 to Furusawa (Year: 2017).*

(Continued)

*Primary Examiner* — Alicia J Weydemeyer
*Assistant Examiner* — Laura B Figg
(74) *Attorney, Agent, or Firm* — Hamre, Schumann, Mueller & Larson, P.C.

(57) ABSTRACT

A rubber-reinforcing cord (12) of the present invention includes at least one strand. The strand includes at least one filament bundle and a coating provided to cover at least a portion of the surface of the filament bundle. The coating contains a polymer and cellulose nanofibers, and does not contain a resorcinol-formaldehyde condensate. The polymer contains at least one selected from a polyurethane and a rubber component. In the coating, the content of the cellulose nanofibers is 0.1 to 10 parts by mass with respect to 100 parts by mass of the polymer. The proportion of the coating in the rubber-reinforcing cord is 18 vol % or more.

10 Claims, 1 Drawing Sheet

(51) Int. Cl.
*D06M 15/564* (2006.01)
*D06M 15/693* (2006.01)
*F16G 1/28* (2006.01)
*F16G 5/06* (2006.01)
*F16G 5/20* (2006.01)

(52) U.S. Cl.
CPC .............. *C08L 1/02* (2013.01); *D06M 15/05* (2013.01); *D06M 15/564* (2013.01); *D06M 15/693* (2013.01); *C08J 2301/02* (2013.01); *C08J 2309/00* (2013.01); *C08J 2375/04* (2013.01); *C08J 2401/02* (2013.01); *C08J 2409/00* (2013.01); *C08J 2475/04* (2013.01); *F16G 1/28* (2013.01); *F16G 5/06* (2013.01); *F16G 5/20* (2013.01)

(56) References Cited

FOREIGN PATENT DOCUMENTS

| | | |
|---|---|---|
| JP | 2010024413 | 2/2010 |
| JP | 2010111983 | 5/2010 |
| JP | 2010275642 | 12/2010 |
| JP | 2015036414 | 2/2015 |
| JP | 2017119936 | 7/2017 |
| JP | 2017119936 A * | 7/2017 |
| WO | 2017104609 | 6/2017 |
| WO | 2017183660 | 10/2017 |
| WO | WO-2017183660 A1 * | 10/2017 .............. D02G 3/28 |
| WO | 2018043246 | 3/2018 |

OTHER PUBLICATIONS

JPlatPat machine translation to English of JP2017-119936 (Year: 2017).*

International Search Report and Written Opinion issued for International Patent Application No. PCT/JP2019/003808, dated Mar. 26, 2019, 9 pages including English translation of Search Report.

Extended European Search Report issued for European Patent Application No. 19754864.7, dated Nov. 17, 2021, 7 pages.

* cited by examiner

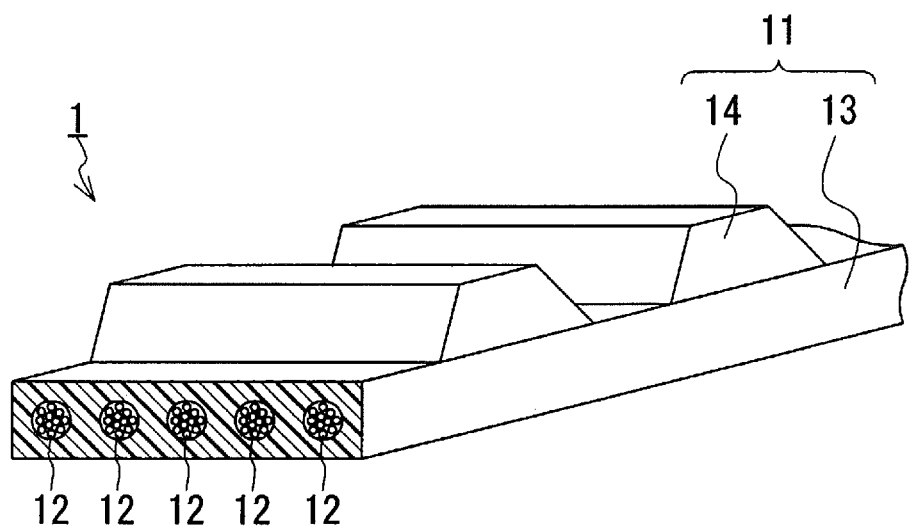

RUBBER-REINFORCING CORD AND RUBBER PRODUCT INCLUDING SAME

TECHNICAL FIELD

The present invention relates to a rubber-reinforcing cord and a rubber product including the rubber-reinforcing cord.

BACKGROUND ART

A rubber product such as a rubber belt commonly includes matrix rubber and a rubber-reinforcing cord embedded in the matrix rubber. The strength of the rubber belt depends on the strength of the rubber-reinforcing cord. The rubber-reinforcing cord is, therefore, an important member that determines the durable life of the rubber belt. The rubber-reinforcing cord is commonly formed of reinforcing fibers (a filament bundle including a plurality of filaments) and a coating protecting the surface of the reinforcing fibers.

For example, in a typical process of producing a transmission belt, a looped reinforcing cord is tucked in matrix rubber for forming a transmission belt. Thereafter, the matrix rubber provided with the reinforcing cord is subjected to thermoforming and is then cut to produce a transmission belt. At this time, the cut surface of the rubber-reinforcing cord is exposed on the cut end surface of the belt. Accordingly, fraying of the rubber-reinforcing cord may occur during the use of the transmission belt, and fiber filaments that have come loose may protrude from the cut surface. Further, such loose fiber filaments may protrude from the end surface of the belt, which increases the risk of trouble such that, for example, they may be wound around a pulley during the use of the belt. Moreover, if fraying occurs, damage may be caused at and spread from the frayed portion of the rubber belt.

In order to suppress the occurrence of the above-described fraying of the rubber reinforcing cord, Patent Literature 1, for example, discloses using glass fiber filaments as reinforcing fibers and properly setting the direction of twists and the number of twists of a bundle of the glass fiber filaments. Also, Patent Literature 2 discloses that a rubber-reinforcing cord resistant to fraying can be obtained by using glass fiber filaments as reinforcing fibers, setting the diameter of the glass fiber filaments in a relatively small range, and setting the number of glass fiber filaments to be assembled, the number of twists, etc. in proper ranges.

CITATION LIST

Patent Literature

Patent Literature 1: JP 6(1994)-184853 A
Patent Literature 1: JP 2010-111983 A

SUMMARY OF INVENTION

Technical Problem

However, the above-described configurations to suppress the occurrence of fraying in the conventional rubber reinforcing cords and rubber products may cause other problems. For example, increasing the number of twists of the bundle of the glass fiber filaments as disclosed in Patent Literature 1 may result in decrease in elastic modulus. Also, for example, setting the diameter of the glass fiber filaments in a small range as disclosed in Patent Literature 2 makes the production more difficult, which may reduce the amount of production per unit time and increase the production cost.

In light of the foregoing, it is an object of the present invention to provide a rubber reinforcing cord that can suppress the occurrence of fraying by means different from limiting the number of twists, the direction of twists, and the diameter of the filaments as in the conventional rubber reinforcing cords. Another object of the present invention is to provide a rubber product that is reinforced by such a rubber-reinforcing cord and in which fraying of the rubber-reinforcing cord is unlikely to occur.

Solution to Problem

The present invention provides a rubber-reinforcing cord for reinforcing a rubber product, including:
at least one strand, wherein
the strand includes at least one filament bundle and a coating provided to cover at least a portion of a surface of the filament bundle,
the coating contains a polymer and cellulose nanofibers and does not contain a resorcinol-formaldehyde condensate,
the polymer contains at least one selected from a polyurethane and a rubber component,
in the coating, the content of the cellulose nanofibers is 0.1 to 10 parts by mass with respect to 100 parts by mass of the polymer, and
the proportion of the coating in the rubber-reinforcing cord is 18 vol % or more.

The present invention also provides a rubber product reinforced by the above rubber-reinforcing cord according to the present invention.

Advantageous Effects of Invention

The present invention can provide a rubber-reinforcing cord that is resistant to fraying. Further, the rubber product of the present invention is reinforced by such a rubber-reinforcing cord and thus fraying of the rubber-reinforcing cord is unlikely to occur.

BRIEF DESCRIPTION OF DRAWINGS

FIG. 1 is a diagram schematically showing an example of the rubber product according to the present invention.

DESCRIPTION OF EMBODIMENTS

Embodiments of the present invention will be described specifically below.

[Rubber-Reinforcing Cord]

A rubber-reinforcing cord according to the present embodiment is a cord for reinforcing rubber products. The rubber-reinforcing cord includes at least one strand. The strand includes at least one filament bundle (reinforcing fibers) and a coating provided to cover at least a portion of the surface of the filament bundle. The coating contains a polymer and cellulose nanofibers, and does not contain a resorcinol-formaldehyde condensate. The polymer contains at least one selected from a polyurethane and a rubber component. In the coating, the content of the cellulose nanofibers is 0.1 to 10 parts by mass with respect to 100 parts by mass of the polymer. The proportion of the coating in the rubber-reinforcing cord is 18 vol % or more.

Hereinafter, a method for producing the reinforcing cord of the present embodiment will be described in detail.

In the rubber-reinforcing cord of the present embodiment, the filament bundle constituting the strand includes a plurality of filaments. The material of the filaments is not particularly limited. The filaments used in the rubber-reinforcing cord of the present embodiment may be, for example, carbon fiber filaments, glass fiber filaments, filaments of polyvinyl alcohol fibers typified by vinylon fibers, polyester fiber filaments, filaments of polyamide fibers such as nylon or aramid (aromatic polyamide) fibers, or poly(p-phenylene benzobisoxazole) (PBO) fiber filaments. Of these, filaments of fibers having excellent dimensional stability, tensile strength, modulus, and bending fatigue resistance are preferably used. In particular, carbon fiber filaments and glass fiber filaments are preferable. The filament bundle may be composed of one type of filaments or two or more types of filaments. The filament bundle may be a bundle of carbon fiber filaments or a bundle of glass fiber filaments.

The number of filaments included in the filament bundle is not particularly limited. The filament bundle can include, for example, 200 to 24,000 filaments.

The surface of the filaments included in the filament bundle may be subjected to a pretreatment for improving the adhesion strength. A preferred example of a pretreatment agent is a compound that contains at least one functional group selected from the group consisting of epoxy groups and amino groups. Examples of the pretreatment agent include aminosilanes, epoxysilanes, novolac epoxy resins, bisphenol A epoxy resins, bisphenol F epoxy resins, brominated epoxy resins, bisphenol AD epoxy resins, and glycidyl amine epoxy resins. Specific examples of the pretreatment agent include Denacol series available from Nagase ChemteX Corporation, EPICLON series available from DIC Corporation, and Epikote series available from Mitsubishi Chemical Corporation. Polyurethane resins and isocyanate compounds can also be used as the pretreatment agent. For example, a treatment agent that contains at least one selected from the group consisting of epoxy resins, urethane resins, and isocyanate compounds may be used as the pretreatment agent. By the pretreatment performed using such a treatment agent, a resin layer that contains at least one selected from the group consisting of epoxy resins, urethane resins, and isocyanate compounds is further provided between the filament bundle and a coating to be formed thereon. For example, even when less-adhesive fiber filaments such as polyparaphenylene terephthalamide fiber filaments are used in a rubber-reinforcing cord, the pretreatment of the surface of the filaments can enhance adhesion between matrix rubber and the rubber-reinforcing cord. It should be noted that a coating of a pretreatment agent (pretreatment agent film) formed on the surface of filaments by the pretreatment of the filaments is different from the coating defined in the present embodiment as covering at least a portion of the surface of a filament bundle, and is not encompassed in the coating defined in the present embodiment.

The number of filament bundles included in the rubber-reinforcing cord is not particularly limited, and may be one or may be two or more. The filament bundle may include a plurality of filament bundles assembled together. In this case, each of the plurality of filament bundles may be twisted or untwisted. The plurality of filament bundles in one bundle may be twisted together or may be untwisted.

The coating is provided to cover at least a portion of the surface of the filament bundle. The coating may be provided directly on the surface of the filament bundle, or may cover the surface of the filament bundle with another layer interposed therebetween. The rubber-reinforcing cord of the present embodiment may or may not be provided with a further coating in addition to this coating.

The coating is formed by providing a water-based treatment agent for coating formation (hereinafter referred to as "water-based coating treatment agent") to be described below on at least a portion of the surface of the filament bundle and then drying it through a heat treatment. The water-based coating treatment agent can be provided on the surface of the filament bundle by, for example, impregnating the filament bundle with the water-based coating treatment agent or applying the water-based coating treatment agent to at least a portion of the surface of the filament bundle. The heat treatment at the time almost completely removes moisture contained in the filaments themselves and a solvent (e.g., water) of the water-based coating treatment agent. Although the method for providing the water-based coating treatment agent to the filament bundle and the method for drying it are not particularly limited, it is preferable to provide the treatment agent in such a manner that the treatment agent penetrates into the filament bundle.

The coating contains a polymer and cellulose nanofibers. As described above, the polymer contains at least one selected from a polyurethane and a rubber component. When the coating contains the polymer and the cellulose nanofibers, the cellulose nanofibers are entangled with the polymer in the coating. The entanglement of the cellulose nanofibers and the polymer renders the coating stronger. As a result, even when a cut surface of the rubber-reinforcing cord is exposed on an end surface of a rubber product, fraying of the rubber reinforcement cord is unlikely to occur.

The coating may consist essentially of the polymer and the cellulose nanofibers, or may consist of the polymer and the cellulose nanofibers. The coating consisting essentially of the polymer and the cellulose nanofibers refers to a coating in which the total content of the polymer and the cellulose nanofibers is 60 mass % or more and desirably 70 mass % or more.

The coating may contain components other than the polyurethane, the rubber component, and the cellulose nanofibers. Examples of the other components include an epoxy resin, isocyanate, colloidal silica, and a silane coupling agent.

In the coating, the content of the cellulose nanofibers is 0.1 to 10 parts by mass with respect to 100 parts by mass of the polymer. In order to obtain a still stronger coating, the content of the cellulose nanofiber is preferably 0.5 parts by mass or more with respect to 100 parts by mass of the polymer. For the same reason, the content of the cellulose nanofiber is preferably 5 parts by mass or less with respect to 100 parts by mass of the polymer.

In the coating, the content of the cellulose nanofibers may be 0.1 to 10 parts by mass with respect to 100 parts by mass of the total content of all the components except the cellulose nanofibers.

In the coating, the total content of the above-described other components (the components other than the polyurethane, the rubber component, and the cellulose nanofibers) is preferably 30 parts by mass or less with respect to 100 parts by mass of the polymer. By setting the total content of the other components within this range, the coating can have a still higher strength.

The cellulose nanofibers contained in the coating are not particularly limited, and preferably have an average fiber diameter of 100 nm or less. The cellulose nanofibers having such an average fiber diameter can be sufficiently entangled with the polymer because their average fiber diameter is roughly equivalent to or smaller than the particle diameters of the polymer components. More preferably, the average fiber diameter of the cellulose nanofibers is 50 nm or less. For example, the average fiber diameter of the cellulose nanofibers is 1 nm or more.

The polyurethane contained in the coating is a thermosetting polyurethane, which may be any of a polyester polyurethane, a polyether polyurethane, and a polycarbonate polyurethane or may be a composite made up of any combination thereof. The above-described polyurethanes each may be one that has been subjected to butadiene modification, acrylic modification, epoxy-modification, or the like. The polyurethane used for coating formation may be, for example, in the form of an aqueous dispersion. The aqueous dispersion may be one forcibly emulsified using an emulsifier, or may be a self-emulsifying dispersion containing a polyurethane modified with a hydrophilic group, such as a carboxy-modified polyurethane.

Examples of the rubber component contained in the coating include a butadiene-styrene copolymer, a dicarboxylated butadiene-styrene copolymer, butadiene rubber, dichlorobutadiene, a vinylpyridine-butadiene-styrene terpolymer, chloroprene, chlorosulfonated polyethylene, an acrylonitrile-butadiene copolymer, and hydrogenated nitrile rubber (HNBR). The hydrogenated nitrile rubber may be carboxyl-modified hydrogenated nitrile rubber.

The coating does not contain a resorcinol-formaldehyde condensate. Since the coating of the rubber-reinforcing cord of the present embodiment contains the cellulose nanofibers, the coating can have a strength high enough to suppress the occurrence of fraying, even if it does not contain a resorcinol-formaldehyde condensate. Since the coating of the rubber-reinforcing cord of the present embodiment is free of a resorcinol-formaldehyde condensate, the coating can be formed without using substances with high impact on the environment, such as formaldehyde and ammonia. Accordingly, there is no need to adopt environmental measures for those who perform the coating formation.

The proportion of the coating in the rubber-reinforcing cord is 18 vol % or more and preferably 23 vol % or more. In this case, the proportion of the coating in the rubber-reinforcing cord may be 36 vol % or less. By setting the proportion of the coating in the rubber-reinforcing cord within the above-described range, the coating can have a sufficient strength, whereby the occurrence of fraying can be suppressed more reliably.

In the rubber-reinforcing cord according to the present embodiment, the strand, which is the filament bundle with the coating formed thereon, may be twisted. The number of twists is not particularly limited. The number of twists given to one strand (the twists may hereinafter be referred to as "primary twists") may be in the range from 30 to 200 twists/m, for example. The number of twists given to a plurality of strands (the twists may hereinafter be referred to as "final twists") may also be in the range from 30 to 200 twists/m, for example. Lang lay may be employed in which the direction of the primary twists and the direction of the final twists are the same, or regular lay may be employed in which the direction of the primary twists and the direction of the final twists are opposite. The directions of the twists are not limited, and may be the S direction or the Z direction.

[Method for Producing Rubber-Reinforcing Cord]

Hereinafter, an example of the method for producing the rubber-reinforcing cord of the present embodiment will be described. The features described for the rubber-reinforcing cord of the present embodiment can be applied to the following production method and may not be described repeatedly. The features described for the following production method can be applied to the rubber-reinforcing cord of the present embodiment. The production method of this example includes the following steps.

First, a filament bundle was produced by assembling a plurality of filaments, and a water-based coating treatment agent to be used for forming a coating is prepared. Next, the water-based coating treatment agent is provided on at least a portion of the surface of the filament bundle. After that, a heat treatment is performed to remove the solvent in the water-based coating treatment agent.

Through the above-described steps, a coating is formed on at least a portion of the surface of the filament bundle. There is no limitation on the method for providing the water-based coating treatment agent on at least a portion of the surface of the filament bundle. For example, the water-based coating treatment agent may be applied onto the surface of the filament bundle, or the filament bundle may be immersed in the water-based coating treatment agent.

The conditions of the heat treatment for removing the solvent of the water-based coating treatment agent are not particularly limited. The heat treatment temperature is, for example, 120° C. to 300° C. The heat treatment time is, for example, 1 to 5 minutes.

The filament bundle with the coating formed thereon (the strand) may be twisted in one direction. The direction of twists may be the S direction or the Z direction. The number of filaments included in the filament bundle and the number of twists given to the strand are as specified above and thus will not be repeatedly described. The rubber-reinforcing cord of the present embodiment can be produced in this manner. A plurality of such filament bundles with the coating formed thereon may be formed and assembled together to form a single bundle, and final twists may be given to the thus-obtained bundle. The direction of the final twists may be the same as or different from the direction of the twists of each of the plurality of filament bundles (the direction of the primary twists). Alternatively, a plurality of filament bundles with a coating formed thereon may be formed and assembled together to form a single bundle without twisting each of the filament bundles, and the thus-obtained bundle may be twisted.

The coating may be formed after the filament bundle has been twisted. The type of the filaments, the number of filaments, and the number of twists of the filaments are as described above.

In a preferred example of the production method of the present embodiment, the rubber-reinforcing cord is formed by applying the water-based coating treatment agent to filament bundles or impregnating filament bundles with the water-based coating treatment agent and then twisting a bundle of the filament bundles in one direction.

Next, the water-based coating treatment agent will be described.

The water-based coating treatment agent contains, for example, an aqueous dispersion of a polymer containing at least one selected from a polyurethane and a rubber component and an aqueous dispersion of cellulose nanofibers. The water-based coating treatment agent may further contain other components to be contained in a resultant coating. The other components contained in the water-based coating treatment agent are the same as those described above as the other components contained in the coating, and thus will not be repeatedly described. These other components are also preferably used in the form of aqueous dispersions in order to allow the components to be uniformly present in the water-based coating treatment agent.

The water-based coating treatment agent does not contain a resorcinol-formaldehyde condensate.

The water-based coating treatment agent may further contain a component other than the above components. For example, the water-based coating treatment agent may further contain a resin, plasticizer, anti-aging agent, stabilizer, or filler as the other component.

[Rubber Product]

A rubber product of the present embodiment is a rubber product reinforced by the rubber-reinforcing cord of the present embodiment. The type of the rubber product is not particularly limited. Examples of the rubber product of the present embodiment include tires of automobiles and bicycles, transmission belts, and conveyor belts. Examples of the transmission belts include synchronous transmission belts and friction transmission belts. Examples of the synchronous transmission belts include toothed belts typified by timing belts for automobiles. Examples of the friction transmission belts include flat belts, round belts, V belts, and V-ribbed belts. That is, the rubber product of the present embodiment may be a toothed belt, flat belt, round belt, V belt, or V-ribbed belt.

The rubber product of the present embodiment is formed by embedding the rubber-reinforcing cord of the present embodiment in a rubber composition (matrix rubber). The technique for embedding the rubber-reinforcing cord in the matrix rubber is not particularly limited, and a commonly-known technique may be employed. The rubber-reinforcing cord of the present embodiment is embedded in the rubber product (e.g., a rubber belt) of the present embodiment. The rubber product of the present embodiment thus formed has high bending fatigue resistance. Therefore, the rubber product of the present embodiment is particularly suitable for use in, for example, a timing belt of a vehicle engine and a belt for driving an accessory of a vehicle.

Rubber contained in the rubber composition in which the rubber-reinforcing cord of the present embodiment is to be embedded is not particularly limited. Desirably, the rubber composition contains urethane rubber. The reason for this is that the rubber-reinforcing cord of the present embodiment can be improved, when used in combination with matrix rubber containing urethane rubber, in adhesion to the matrix rubber.

FIG. 1 shows a toothed belt as one example of the rubber product. The toothed belt 1 shown in FIG. 1 includes a belt body 11 and a plurality of rubber-reinforcing cords 12. The belt body 11 includes a belt portion 13 and a plurality of tooth portions 14 arranged at regular intervals and protruding from the belt portion 13. The rubber-reinforcing cords 12 are embedded within the belt portion 13 so as to extend parallel to the length direction of the belt portion 13. Each rubber-reinforcing cord 12 is the rubber-reinforcing cord of the present embodiment.

EXAMPLES

Hereinafter, the embodiment of the present invention will be described in more detail with reference to examples and comparative examples.

Production of Rubber-Reinforcing Cord

Examples 1 to 5

6000 carbon fiber filaments (average diameter: 7 μm) were assembled together to produce a filament bundle. A water-based treatment agent whose solids composition has a mass ratio (solid mass ratio) as shown in Table 1 below was applied to this filament bundle and dried in a drying oven set at 150° C. for 1 minute. A strand was formed in this manner. The thus-obtained strand was twisted in one direction at 40 turns/m. The proportion of the coating in the resultant rubber-reinforcing cord was 18 vol %. In Examples 1 to 5, water-based treatment agents W1 to W5 shown in Table 1 were used, respectively. Rubber-reinforcing cords of Examples 1 to 5 were obtained in the above-described manner.

Examples 6 to 10

Rubber-reinforcing cords of Examples 6 to 10 were produced in the same manners as in Examples 1 to 5, respectively, except that a glass fiber filament bundle was used as the filament bundle. The proportion of the coating in each of the resultant cords was 18 mass %. The glass fiber filament bundle used in each of Examples 6 to 10 was produced in the following manner. A glass fiber constituted by a bundle of 200 glass fiber filaments (composed of E-glass and having an average diameter of 9 μm) was prepared. Three such glass fibers were aligned to obtain a bundle (filament bundle), and a water-based treatment agent whose solids composition has a mass ratio (solid mass ratio) as shown in Table 1 below was applied to the bundle and then dried in a drying oven set at 150° C. for 1 minute. A strand was formed in this manner. The thus-obtained strand was primarily twisted at 80 turns/m. Then, 11 such twisted strands were aligned and finally twisted at 80 turns/m.

Comparative Examples 1 to 4

Reinforcing cords of Comparative Examples 1 to 4 were each obtained in the same manner as in Example 1, except that a water-based treatment agent whose solids composition has a mass ratio (solid mass ratio) as shown in Table 2 below was used to form a coating. In Comparative Examples 1 to 4, water-based treatment agents WR1 to WR4 shown in Table 2 were used, respectively.

Comparative Examples 5 and 6

Rubber-reinforcing cords of Comparative Examples 5 and 6 were each produced in the same manner as in Example 1, except that the proportion of the coating in the resultant rubber-reinforcing cord was set to 17 vol % in Comparative Example 5 and 14 vol % in Comparative Example 6.

Comparative Examples 7 to 10

Rubber-reinforcing cords of Comparative Examples 7 to 10 were produced in the same manners as in Comparative Examples 1 to 4, respectively, except that a glass fiber filament bundle was used as the filament bundle. The proportion of the coating in each of the resultant rubber-reinforcing cords was 18 vol %. The glass fiber filament bundles used in Comparative Examples 7 to 10 were the same as those produced in Examples 6 to 10.

Comparative Examples 11 and 12

Rubber-reinforcing cords of Comparative Examples 11 and 12 were produced in the same manners as in Comparative Examples 5 to 6, respectively, except that a glass fiber filament bundle was used as the filament bundle. The proportion of the coating in the resultant rubber-reinforcing cord was 17 vol % in Comparative Example 11 and 14 vol % in Comparative Example 12. The glass fiber filament bundles used in Comparative Examples 11 to 12 were the same as those produced in Examples 10 to 6.

TABLE 1

| Components | Solid mass ratio (parts by mass) | | | | |
|---|---|---|---|---|---|
| | W1 | W2 | W3 | W4 | W5 |
| Polycarbonate polyurethane (*1) | 100 | 100 | 100 | 100 | 100 |
| Cellulose nanofibers (*2) | 0.1 | 0.5 | 1 | 5 | 10 |

(*1) EVAFANOL APC-55 (NICCA CHEMICAL CO., LTD.)
(*2) RHEOCRYSTA I-2SX (DKS Co. Ltd.)

TABLE 2

| Components | Solid mass ratio (parts by mass) | | | |
|---|---|---|---|---|
| | WR1 | WR2 | WR3 | WR4 |
| Polycarbonate polyurethane (*1) | 100 | 100 | 100 | 100 |
| Cellulose nanofibers (*2) | 0 | 0.01 | 0.05 | 11 |

(*1) EVAFANOL APC-55 (NICCA CHEMICAL CO., LTD.)
(*2) RHEOCRYSTA I-2SX (DKS Co. Ltd.)

[Method for Measuring the Number of Frays]

The number of frays in the rubber-reinforcing cords produced in each of the examples and comparative examples was measured. Three rubber-reinforcing cords were arranged in an aluminum container having a width of 30 mm, a length of 80 mm, and a depth of 22 mm. 12 g of epoxy resin emulsion (Nagase ChemteX Corporation., "Denacol") was poured into this container, and then, 1.2 g of diamine (T&K TOKA Co., Ltd., "FUJICURE") was added thereto. The epoxy resin was cured at 110° C. for 20 minutes. As a result, an epoxy resin solid with the rubber reinforcing cords included therein was obtained. This solid was divided along the length direction of the rubber-reinforcing cords using a cutter knife, and the number of frays in the fibers exposed on the cut end surface was measured. The solid was divided along the length direction of the rubber-reinforcing cords in such a manner that each rubber-reinforcing cord was divided into two parts in a direction orthogonal to the length direction. The results are shown in Tables 3 to 6.

[Method for Measuring Elastic Modulus]

Each of the water-based treatment agents shown in Tables 1 and 2 was poured into a Teflon (registered trademark) container having a square shape (30 cm×30 cm) with a depth of 5 mm and dried at 40° C. for 24 hours to obtain a film. The thus-obtained film was crosslinked for 30 minutes at 100° C. under a pressure of 100 kg/cm². The crosslinked film was cut into a dumbbell shape (No. 3, JIS K 6251) to obtain a test piece. Using a tensile tester, the relationship between the elongation and the tensile strength of this test piece was determined. The tensile strength was measured at 100 mm/min. The load being applied to the film when the film exhibited an elongation of 100% was set to $S_{100}$, and the load being applied to the film when the film exhibited an elongation of 200% was set to $S_{200}$. From these results, the elastic modulus of the film was calculated as per the following equation. The results are shown in Tables 3 to 6.

Elastic modulus=$(S_{200}-S_{100})/(200\%-100\%)$

TABLE 3

| Examples | 1 | 2 | 3 | 4 | 5 |
|---|---|---|---|---|---|
| Water-based treatment agent used | W1 | W2 | W3 | W4 | W5 |
| Proportion (vol %) of coating in rubber-reinforcing cord | 18 | 18 | 18 | 18 | 18 |
| The number of frays | 0 | 0 | 0 | 0 | 0 |
| Elastic modulus (MPa) of film formed of water-based treatment agent | 3.83 | 4.01 | 3.68 | 3.89 | 2.89 |

TABLE 4

| Examples | 6 | 7 | 8 | 9 | 10 |
|---|---|---|---|---|---|
| Water-based treatment agent used | W1 | W2 | W3 | W4 | W5 |
| Proportion (vol %) of coating in rubber-reinforcing cord | 18 | 18 | 18 | 18 | 18 |
| The number of frays | 0 | 0 | 0 | 0 | 0 |
| Elastic modulus (MPa) of film formed of water-based treatment agent | 3.83 | 4.01 | 3.68 | 3.89 | 2.89 |

TABLE 5

| Comparative Examples | 1 | 2 | 3 | 4 | 5 | 6 |
|---|---|---|---|---|---|---|
| Water-based treatment agent used | WR1 | WR2 | WR3 | WR4 | W1 | W1 |
| Proportion (vol %) of coating in rubber-reinforcing cord | 18 | 18 | 18 | 18 | 17 | 14 |
| The number of frays | 3 | 2 | 1 | 1 | 1 | 2 |
| Elastic modulus (MPa) of film formed of water-based treatment agent | 0.52 | 0.90 | 2.70 | 2.59 | 3.83 | 3.83 |

TABLE 6

| Comparative Examples | 7 | 8 | 9 | 10 | 11 | 12 |
|---|---|---|---|---|---|---|
| Water-based treatment agent used | WR1 | WR2 | WR3 | WR4 | W1 | W1 |
| Proportion (vol %) of coating in rubber-reinforcing cord | 18 | 18 | 18 | 18 | 17 | 14 |
| The number of frays | 3 | 2 | 1 | 1 | 1 | 2 |
| Elastic modulus (MPa) of film formed of water-based treatment agent | 0.52 | 0.90 | 2.70 | 2.59 | 3.83 | 3.83 |

The rubber-reinforcing cords of Examples 1 to 10 all had no frays. In contrast, frays were observed in the rubber-reinforcing cords of Comparative Examples 1 to 12. Specifically, it was demonstrated that the films formed of the water-based treatment agents in which the content of the cellulose nanofibers is not less than 0.1 parts by mass and not more than 10 parts by mass with respect to 100 parts by mass of the polymer (polyurethane in this case) exhibited high elastic moduli, and out of the rubber-reinforcing cords provided with a coating formed of such a water-based treatment agent, those in which the proportion of the coating is 18 vol % or more were free of frays.

INDUSTRIAL APPLICABILITY

The present invention is applicable to rubber-reinforcing cords for reinforcing rubber products and rubber products using such rubber-reinforcing cords.

The invention claimed is:

1. A rubber-reinforcing cord for reinforcing a rubber product, the rubber-reinforcing cord comprising:
   at least one strand, wherein
   the strand comprises at least one filament bundle and a coating provided to cover at least a portion of a surface of the filament bundle,
   the coating contains a polymer and cellulose nanofibers and does not contain a resorcinol-formaldehyde condensate,
   the polymer contains at least one selected from a polyurethane and a rubber component,
   in the coating, the content of the cellulose nanofibers is 0.1 to 10 parts by mass with respect to 100 parts by mass of the polymer, and
   the proportion of the coating in the rubber-reinforcing cord is 18 vol % or more.

2. The rubber-reinforcing cord according to claim 1, wherein, in the coating, the content of the cellulose nanofibers is 0.1 to 10 parts by mass with respect to 100 parts by mass of the total content of all components except the cellulose nanofibers.

3. The rubber-reinforcing cord according to claim 1, wherein the cellulose nanofibers have an average fiber diameter of 100 nm or less.

4. The rubber-reinforcing cord according to claim 1, wherein a filament included in the filament bundle is a carbon fiber filament or a glass fiber filament.

5. A rubber product reinforced by the rubber-reinforcing cord according to claim 1.

6. The rubber product according to claim 5, being a rubber belt comprising matrix rubber and the rubber-reinforcing cord embedded in the matrix rubber.

7. The rubber product according to claim 6, wherein the matrix rubber comprises urethane rubber.

8. The rubber-reinforcing cord according to claim 1, wherein a filament included in the at least one filament bundle is a glass fiber filament.

9. The rubber-reinforcing cord according to claim 1, wherein in the coating, a content of the cellulose nanofibers is 5 parts by mass or less with respect to 100 parts by mass of the polymer.

10. The rubber-reinforcing cord according to claim 1, wherein the polymer contains the polyurethane.

* * * * *